Patented Mar. 30, 1954

2,673,873

UNITED STATES PATENT OFFICE 2,673,873

BASIC ESTERS OF 9,10-DIHALOGENATED 9,10 - DIHYDRO - 9,10 - ETHANOANTHRACENE-11-CARBOXYLIC ACIDS AND THEIR DERIVATIVES

William W. Jenkins, Morton Grove, Ill., assignor to G. D. Searle & Co., Chicago, Ill., a corporation of Illinois No Drawing. Application June 3, 1952, Serial No. 291,575

12 Claims. (Cl. 260—469)

1

The present invention relates to a new group of basic esters of polycarbocyclic acids, and, particularly, to the basic esters of 9,10-dihalogenated 9,10 - dihydro-9,10-ethanoanthracene-11-carboxylic acids and their derivatives. These esters and their non-toxic salts which constitute the invention are represented by the following general structural formula

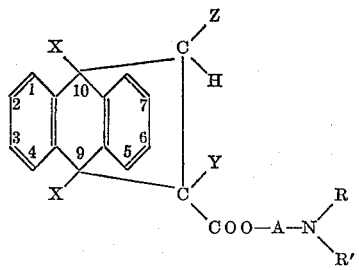

wherein X is a halogen atom, Y and Z are members of the class consisting of hydrogen and lower alkyl radicals, A is a saturated lower bivalent hydrocarbon radical containing at least 2 carbon atoms and NRR' is either a lower dialkylamino radical or a nitrogen-containing heterocyclic radical attached through a nitrogen in the heterocycle to the radical A.

As shown in the foregoing structural formula the ethano-bridge may be unsubstituted or loweralkylated by the groups referred to as Y and Z which, besides hydrogen, can represent such lower alkyl radicals as methyl, ethyl, propyl, butyl, amyl, and hexyl.

The radical A is derived from such straight-chained or branch-chained aliphatic hydrocarbon radicals as ethylene, propylene, butylene, amylene, hexylene or a polymethylene radical such as trimethylene, tetramethylene, pentamethylene and hexamethylene.

The radicals R and R' can be straight- or branched-chained lower alkyl groups. The radical NRR' can also be a nitrogen-containing lower heterocycle such as piperazino, N'-alkylpiperazino, thiamorpholino, quinolino, and isoquinolino, but of particular interest are the heterocyclic radicals of the type

wherein B is either an ethyleneoxyethylene radical, as in the case of morpholine or an alkylene chain containing 4 to 7 carbon atoms, 4 to 5 of which are in nuclear position as in the case of pyrrolidino, piperidino, 2,5-dimethylpyrrolidino and 2,6-lupetidino radicals.

2

The organic bases described herein form nontoxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The acids which constitute the starting materials for this invention are prepared by a Diels-Alder addition of a compound of the type

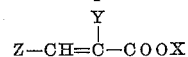

wherein X is hydrogen or a lower alkyl group, and Y and Z are defined as hereinabove to a 9,10-dihalogenated anthracene. Esterification is carried out preferably by refluxing a solution of the acid with an equivalent of the aminoalkyl halide in an inert solvent such as 2-propanol or acetone. The hydrohalide of the basic ester is thus produced and is separated as such or neutralized and extracted as the basic ester. The basic ester can also be prepared by reacting the acid halide with an excess of the amino alcohol, neutralizing the reaction mixture, and extracting the basic ester.

The compounds which constitute the present invention are useful as intermediates in chemical synthesis. They are also useful as medicinal agents. They are potent blood pressure lowering drugs. The simple addition salts are diuretics. The quaternary salts are ganglion blocking agents.

My invention is disclosed in further detail by the following examples which are set forth for the purpose of illustrating this invention, but are in no way to be construed as limiting it is spirit or in scope. It will be apparent to those skilled in the art of organic synthesis that many conventional modifications in methods, conditions, and materials can be adapted without departing therefrom. In these examples temperatures are given uncorrected in degrees centigrade (° C.), pressure during vacuum distillation in millimeters (mm.) of mercury, and quantities of materials in parts by weight.

EXAMPLE 1

9,10 - dihydro - 9,10-dibromo-9,10-ethanoanthracene-11-carboxylic acid ester of β-diethylaminoethanol

A mixture of 404 parts of 9,10-dibromoanthracene and 400 parts of methyl acrylate is heated in a bomb at 190–200° C. for 6 hours. The contents are then heated at reflux temperature with 1600 parts of methanol and 160 parts of potassium hydroxide in 160 parts of water for 4 hours. The mixture is concentrated in vacuo and the residue is suspended in 6000 parts of water, washed with ether, clarified with decolorizing charcoal and acidified with dilute hydrochloric acid. The precipitated 9,10-dihydro-9,10-dibromo-9,10-ethanoanthracene-11-carboxylic acid is collected on a filter and recrystallized from methanol. It melts at about 248–250° C.

A mixture of 408 parts of this acid and 150 parts of β-chloroethyldiethylamine in 1200 parts of anhydrous 2-propanol is heated at reflux temperature for 7 hours. Upon standing at room temperature a precipitate is formed which is collected on a filter and then dissolved in water. The aqueous solution is washed with ether and then rendered alkaline by addition of sodium hydroxide and extracted with ether. The ether extract is dried over anhydrous calcium sulfate, filtered and evaporated. The product decomposes upon distillation.

105 parts of the crude β-diethylaminoethanol ester of 9,10-dihydro-9,10-dibromo-9,10-ethanoanthracene-11-carboxylic acid are dissolved in absolute ether, clarified with charcoal, and diluted with 2000 parts of ether. The ether solution is treated with one equivalent of a 25% solution of hydrogen chloride in anhydrous 2-propanol. Upon chilling the hydrochloride of the diethylaminoethanol ester of 9,10-dihydro-9,10-dibromo-9,10-ethanoanthracene-11-carboxylic acid precipitates, which melts at about 200–200.5° C. with decomposition. Recrystallization from 2-propanol does not raise the melting point.

EXAMPLE 2

9,10-dihydro-9,10-dibromo - 9,10 - ethanoanthracene-11-carboxylic acid ester of β-hydroxyethyldiethylmethylammonium bromide

A solution of 105 parts of the β-diethylaminoethyl 9,10 - dihydro - 9,10-dibromo-9,10-ethanoanthracene-11-carboxylate in 240 parts of butanone is treated with 35 parts of methyl bromide in a shielded pressure reactor at room temperature for one hour, during which time a heavy oil separates. The reaction is completed by heating for one hour at 80° C., and on standing, the oil crystallizes. The crystals are collected on a filter and recrystallized from a mixture of 2-propanol and ethyl acetate. The 9,10-dihydro-9,10-dibromo-9,10-ethanoanthracene-11-carboxylic acid ester of β-hydroxyethyldiethylmethylammonium bromide, which melts at about 185–186° C. with decomposition, has the structural formula

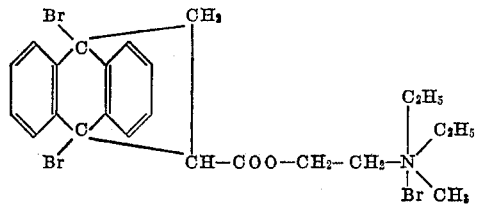

EXAMPLE 3

9,10 - dihydro - 9,10 - dibromo - 12 - methyl-9,10-ethanoanthracene-11-carboxylic acid ester of β-diethylaminoethanol

A mixture of 303 parts of dibromoanthracene and 120 parts of crotonic acid is heated in a bomb at 175° C. for 8 hours. After cooling the reaction mixture is extracted with 5000 parts of 5% sodium hydroxide and filtered. The filtrate is chilled and the solid sodium salt collected on a filter, suspended in water and acidified by addition of dilute hydrochloric acid. The precipitate of the free acid is collected on a filter and recrystallized from xylene. It melts at about 271–271.5° C.

A mixture of 365 parts of 9,10-dihydro-9,10-dibromo-12-methyl-9,10-ethanoanthracene - 11 - carboxylic acid and 120 parts of β-chloroethyldiethylamine in 1200 parts of anhydrous 2-propanol is heated at reflux temperature for 6 hours. Within an hour the mixture sets to a semi-solid mass. The reaction product is collected on a filter and suspended in water. After alkalinization the aqueous suspension is extracted with ether and the ether extract is dried over anhydrous potassium carbonate, filtered and evaporated. The crude oily β-diethylaminoethanol ester of 9,10-dihydro-9,10-dibromo-12-methyl 9,10-ethanoanthracene-11-carboxylic acid is dissolved in ether and treated with one equivalent of a 25% solution of hydrogen chloride in anhydrous 2-propanol. There is an immediate precipitation of white crystals. The hydrochloride is recrystallized from ethanol with charcoal clarifications. It melts at about 233–234° C. with decomposition.

EXAMPLE 4

9,10 - dihydro - 9,10 - dibromo - 12 - methyl-9,10-ethanoanthracene-11-carboxylic acid ester of β - hydroxyethyldiethylmethylammonium bromide

A mixture of 190 parts of the β-diethylaminoethanol ester of 9,10-dihydro-9,10-dibromo-12-methyl - 9,10 - ethanoanthracene - 11-carboxylic acid and 61 parts of methyl bromide in 240 parts of butanone is heated for one hour in a shielded pressure reactor and then chilled. The resulting crystals are collected on a filter and recrystallized from a mixture of 2-propanol and ethyl acetate. The 9,10 - dihydro - 9,10-dibromo-12-methyl - 9,10 - ethanoanthracene - 11-carboxylic acid ester of β-hydroxyethyldiethylmethylammonium bromide, which melts at about 200–203° C. with decomposition, has the structural formula

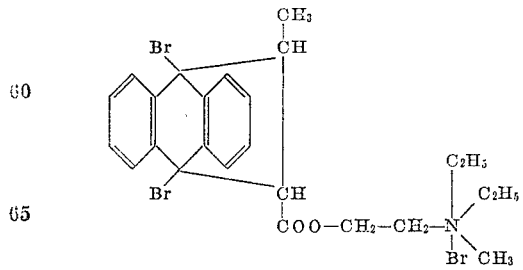

EXAMPLE 5

9,10-dihydro-9,10 - dichloro - 12-ethyl-9,10-ethanoanthracene-11-carboxylic acid ester of γ-(N-morpholino) propanol

A mixture of 610 parts of 2-pentenoic acid and 100 parts of 9,10-dichloroanthracene is heated in a bomb at about 170° C. for 6 hours, cooled and extracted with a dilute aqueous solution of sodium hydroxide. The extract is washed with ether, rendered acid by addition of dilute hydrochloric acid, filtered and extracted with ether. The ether extract is stirred with charcoal, filtered and evaporated to yield the 9,10-dihydro-9,10-dichloro-12-ethyl-9,10-ethanoanthracene-11-carboxylic acid.

A mixture of 347 parts of this acid and 165 parts of N-(γ-chloropropyl)morpholine in 2000 parts of absolute 2-propanol is heated at reflux temperature for 18 hours. The reaction mixture is partially concentrated and the residue suspended in water, washed with ether, and rendered alkaline by the addition of sodium hydroxide. The base is extracted with ether and the ether extract is washed with water, dried over anhydrous potassium carbonate, filtered, stirred with decolorizing charcoal and evaporated. The clear viscous oil is high boiling and decomposes on vacuum distillation. The γ-(N-morpholino)propanol ester of 9,10-dihydro-9,10-dichloro-12-ethyl-9,10-ethanoanthracene-11-carboxylic acid has the structural formula

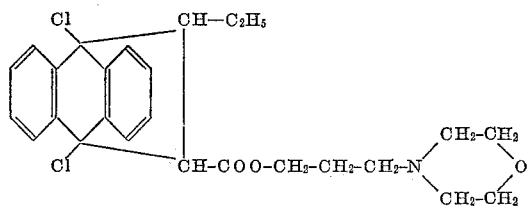

EXAMPLE 6

*9,10-dihydro-9,10 - dibromo-11-methyl-9,10-ethanoanthracene-11-carboxylic acid ester of β-diethylaminoethanol*

In a bomb 404 parts of 9,10-dibromoanthracene and 200 parts of methyl methacrylate are heated at 170° C. for 8 hours and the resulting mixture is refluxed for 12 hours with 1600 parts of methanol and a solution of 400 parts of potassium hydroxide in 400 parts of water. The solvent is evaporated in vacuo and the residue is extracted with water. This extract is washed with ether, clarified with charcoal and acidified with dilute hydrochloric acid. The 9,10-dihydro-9,10-dibromo-11-methyl-9,10 - ethanoanthracene - 11-carboxylic acid precipitates which, recrystallized from xylene, melts at about 237–239° with decomposition.

A mixture of 422 parts of this acid and 150 parts of β-chloroethyldiethylamine in 1200 parts of anhydrous 2-propanol is heated at reflux temperature for 7 hours and permitted to stand. After trituration with 3000 parts of ether, the product is collected on a filter and suspended in water. After alkalinization the base is extracted with ether and the extract washed with water, dried over anhydrous potassium carbonate, filtered and evaporated.

420 parts of the β-diethylaminoethanol ester of 9,10-dihydro-9,10 - dibromo-11-methyl-9,10-ethanoanthracene-11-carboxylic acid, obtained as a viscous oil, are dissolved in 6000 parts of anhydrous ether and treated with one equivalent of hydrogen chloride in absolute ethanol. The immediately precipitating white hydrochloride is collected on a filter and recrystallized from 2-propanol. It melts at about 205° C. with decomposition.

EXAMPLE 7

*9,10-dihydro-9,10 - dibromo-11-methyl-9,10-ethanoanthracene - 11 - carboxylic acid ester of β - hydroxyethyldiethylmethylammonium bromide*

A mixture of 210 parts of the β-diethylaminoethyl ester of 9,10 - dihydro - 9,10 - dibromo - 11-methyl-9,10 - ethanoanthracene - 11 - carboxylic acid and 68 parts of methyl bromide in 280 parts of butanone is maintained in a shielded pressure reactor at room temperature until it has set to a solid mass of white crystals. These crystals are dissolved in anhydrous 2-propanol and reprecipitated by addition of absolute ethyl acetate. The 9,10-dihydro-9,10 - dibromo-11-methyl-9,10-ethanoanthracene - 11 - carboxylic acid ester of β-hydroxyethyldiethylmethylammonium bromide, which melts at about 203.5–209° C. with decomposition, has the structural formula

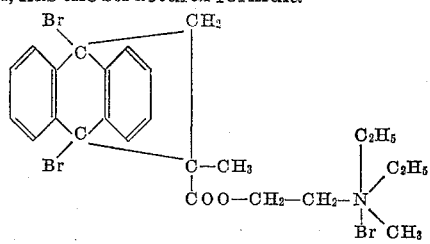

Treatment of a solution of 3 moles of the bromide in 2-propanol with one mole of silver citrate and 2 moles of citric acid by stirring at room temperature, removal of the precipitated silver bromide by filtration and concentration of the filtrate yields the dihydrogen citrate.

EXAMPLE 8

*9,10-dihydro - 9,10 - dichloro-11-ethyl-9,10-ethanoanthracene-11-carboxylic acid ester of γ-diisopropylaminopropanol*

In a bomb a mixture of 165 parts of 9,10-dichloroanthracene and 100 parts of 2-ethylacrylic acid is heated at about 175° C. for 7 hours. After cooling the reaction mixture is extracted with 5% aqueous sodium hydroxide solution. The extract is washed with ether, clarified with charcoal and acidified with dilute hydrochloric acid. The precipitated acid is collected on a filter.

A solution of 178 parts of γ-chloropropyldiisopropylamine in 2000 parts of anhydrous propanol is heated with 347 parts of the 9,10-dihydro-9,10 - dichloro-11-ethyl-9,10-ethanoanthracene-11-carboxylic acid at reflux temperature for 10 hours and then concentrated. The residue is extracted with water and the aqueous solution washed with ether, rendered alkaline and then extracted with ether. The ether extract is dried over anhydrous calcium sulfate, stirred with decolorizing charcoal, filtered and evaporated, yielding the γ-diisopropylaminopropanol ester of 9,10-dihydro-9,10-dichloro - 11 - ethyl-9,10-ethanonanthracene-11-carboxylic acid as a clear viscous oil which tends to decompose on distillation. It has the structural formula

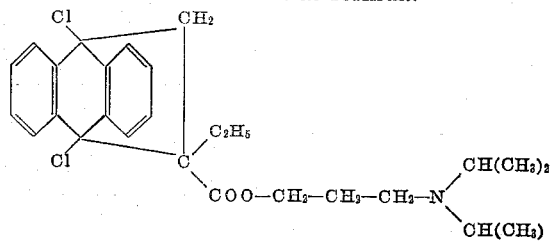

EXAMPLE 9

*9,10-dihydro - 9,10 - dichloro-11,12-diethyl-9,10-ethanoanthracene-11-carboxylic acid ester of N-(β-hydroxyethyl)-2,6-lupetidine*

A mixture of 780 parts of 2-ethyl-2-pentenoic acid and 1000 parts of 9,10-dichloroanthracene is heated in a bomb for 8 hours at 175° C., and cooled and extracted with a large volume of 5% aqueous sodium hydroxide solution. This extract is washed with ether, clarified with charcoal, acidified with dilute hydrochloric acid and then extracted with ether. This extract is solvent stripped in vacuo, leaving as a residue the 9,10-dihydro - 9,10-dichloro - 11,12-diethyl-9,10-ethanoanthracene-11-carboxylic acid.

375 parts of this acid are heated with a solution of 175 parts of N-(β-chloroethyl)-2,6-lupetidine in 2200 parts of anhydrous 2-propanol at reflux temperature for 15 hours and then extracted with water. The aqueous extract is washed with ether, rendered alkaline and extracted with ether. The ether extract is dried over anhydrous potassium carbonate, washed with water, stirred with decolorizing charcoal, filtered and evaporated. The resulting N-(β-hydroxyethyl)-2,6-lupetidine ester of 9,10-dihydro - 9,10-dichloro-11,12-diethyl-9,10-ethanoanthracene-11-carboxylic acid is obtained as a clear, amber, viscous oil which decomposes on distillation. It has the structural formula

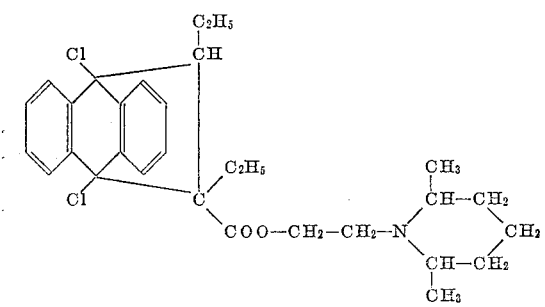

I claim:
1. The group of new esters consisting of the bases represented by the compounds of the structural formula

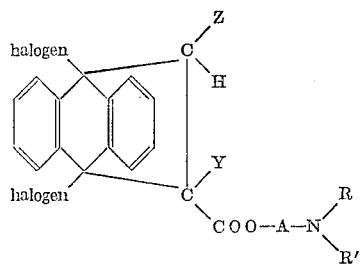

and the non-toxic acid addition and quaternary salts thereof, wherein Y and Z are members of the class consisting of hydrogen and lower alkyl radicals, A is a lower alkylene radical containing at least 2 carbon atoms, and NRR' is a member of the class consisting of lower dialkylamino radicals, morpholino radicals and radicals wherein R and R' are combined to form a lower alkylene radical containing 4 to 7 carbon atoms, 4 to 5 of which are in nuclear position, and wherein the halogen atoms are of an atomic weight greater than 20.

2. The esters of the structural formula

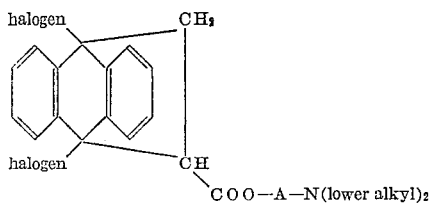

wherein A is a lower alkylene radical containing at least 2 carbon atoms and wherein the halogen atoms are of an atomic weight greater than 20.

3. The esters of the structural formula

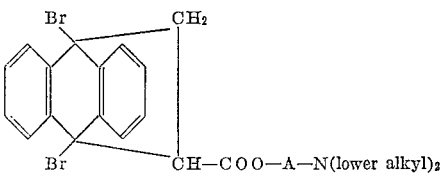

wherein A is a lower alkylene radical containing at least 2 carbon atoms.

4. The esters of the structural formula

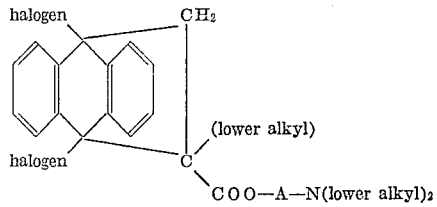

wherein A is a lower alkylene radical containing at least 2 carbon atoms and wherein the halogen atoms are of an atomic weight greater than 20.

5. The esters of the structural formula

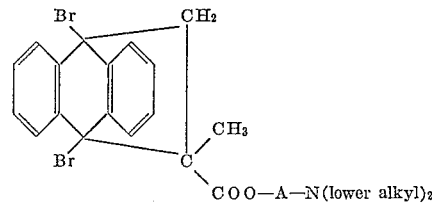

wherein A is a lower alkylene radical containing at least 2 carbon atoms.

6. 9,10 - dihydro-9,10-dibromo-11-methyl-9,10-ethanoanthracene-11-carboxylic acid ester of β-diethylaminoethanol.

7. The esters of the structural formula

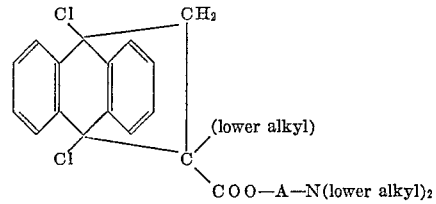

wherein A is a lower alkylene radical containing at least 2 carbon atoms.

8. The esters of the structural formula

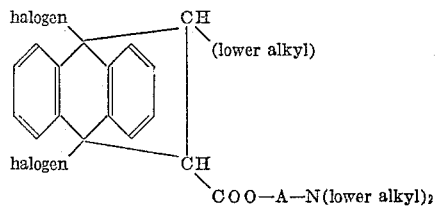

wherein A is a lower alkylene radical containing at least 2 carbon atoms and wherein the halogen atoms are of an atomic weight greater than 20.

9. The esters of the structural formula

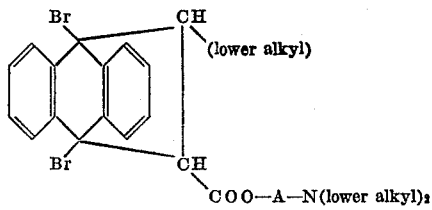

wherein A is a lower alkylene radical containing at least 2 carbon atoms.

10. The esters of the structural formula

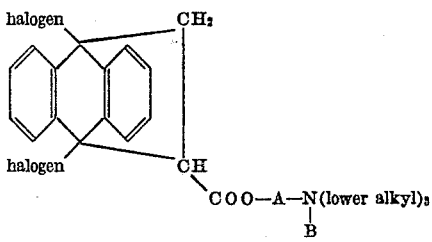

wherein A is a lower alkylene radical containing at least 2 carbon atoms and wherein the halogen atoms are of an atomic weight greater than 20 and B is a non-toxic anion.

11. The esters of the structural formula

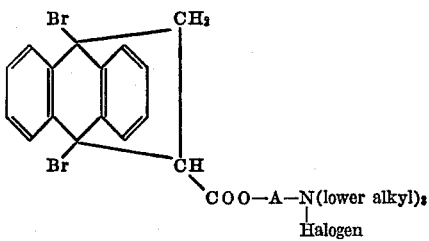

wherein A is a lower alkylene radical containing at least 2 carbon atoms and wherein the halogen atom is of an atomic weight greater than 20.

12. The esters of the structural formula

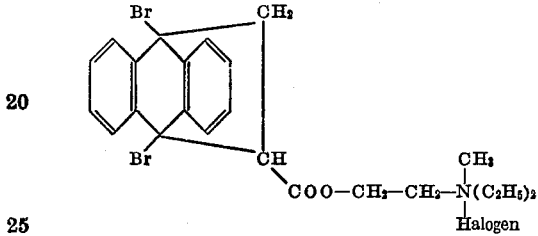

wherein the halogen atom is of an atomic weight greater than 20.

WILLIAM W. JENKINS.

No references cited.